J. JÜRGENSEN.

STEM SETTING WATCH.

No. 4,334. Reissued Apr. 11, 1871.

Witnesses:

E. R. Brown

Silas Loomis

Inventor.

Jules Jürgensen by T. C. Theaker

Attorney.

United States Patent Office.

JULES JÜRGENSEN, OF LOCLE, SWITZERLAND.

Letters Patent No. 61,207, dated January 15, 1867; reissue No. 4,334, dated April 11, 1871.

IMPROVEMENT IN STEM-SETTING WATCHES.

The Schedule referred to in these Letters Patent and making part of the same.

*To all whom it may concern:*

Be it known that I, JULES JÜRGENSEN, formerly of Copenhagen, in the Kingdom of Denmark, but now of Locle, in the Republic of Switzerland, have invented a certain new and useful Improvement in Stem-Setting Watches; and I do hereby declare that the following is a full, clear, and exact description thereof, sufficient to enable those skilled in the art to which my invention appertains to make and use the same, reference being had to the accompanying drawing making part of this specification and to the letters and figures marked thereon.

The nature of my invention consists in so constructing the rotating device and the bow or pendent ring, and so arranging them with relation to each other that, by turning down the bow, the rotating device is thrown into gear with the mechanism which operates the hands.

In stem-setting watches, as previously constructed, it has been usual, in addition to the stem-turning gear, whereby the hands are adjusted, or set forward or backward, as required, to employ a pin or spring, arranged to protrude from the case, and requiring a separate application of pressure or force—say, by the thumb or finger—before and while turning the rotating device at the stem, for the purpose of locking said rotating device with the cannon or minute-hand-operating pinion of the watch. This, however, is very objectionable, not only on account of the double manipulation requisite to set the hands, but also on account of the liability to accidental and improper adjustment of them by some casual outside contact with and action on the stem-gearing pin or spring, and turning of the attachment that is used for setting the hands.

The difficulties referred to are obviated in my invention by making automatic, consequent on the adjustment of the pendent bow of the stem when the cap or a portion of the case only is open, the gearing of the rotating device at the stem with the cannon-pinion of the watch, the pendent bow controlling the action of the rotating device.

In the accompanying drawing—

A represents the rim of the case;

B, the pendent or stem; and

C, the bow or pendent ring.

The bow C is divided where it is hung in the stem so as to admit of a spindle, D, passing up through the latter.

The spindle D is provided with a milled cap or rose-head, *a*, on its exterior end, to facilitate the turning of it by the fingers in setting the hands of the watch; and, passing through the rim into the body of the case, and supported by suitable bearings, it carries, near its opposite or inner end, a clutch, *b*, the inner face of which is made to form, or has attached to it, a contrate wheel, *c*.

The clutch *b* is made to turn with the spindle D, and also to slide longitudinally on it, for the purpose of throwing said spindle by the contrate wheel *c* in or out of gear with a pinion, *d*, that meshes through a train of spur-wheels or pinions, *e f*, with the cannon-pinion *g* of the watch.

Figure 1:
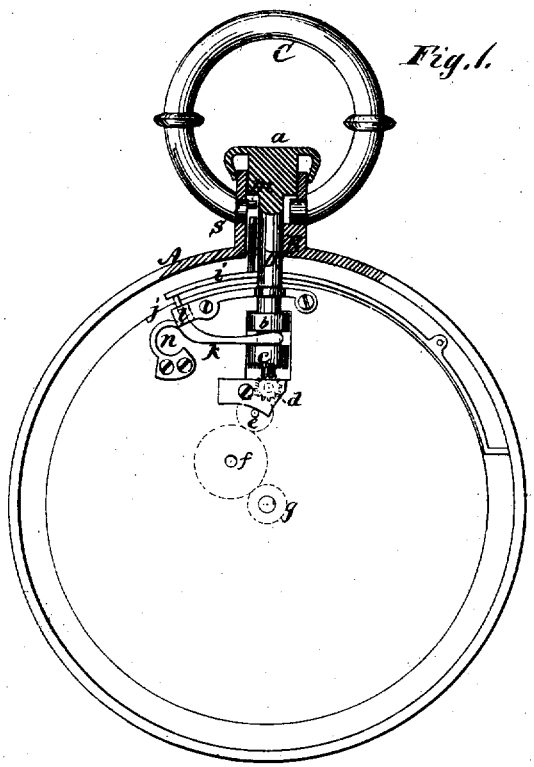
Figure 1 represents, on an enlarged scale, a side or face view in section of a watch-case, with stem and pendent bow attached, and such portion of the interior mechanism as relates to my invention.
Figure 2:
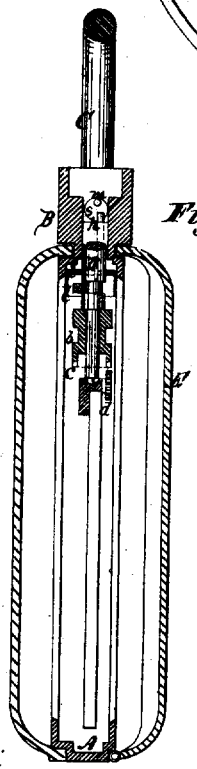
Figure 2 is a transverse section of the same.
Figure 3:
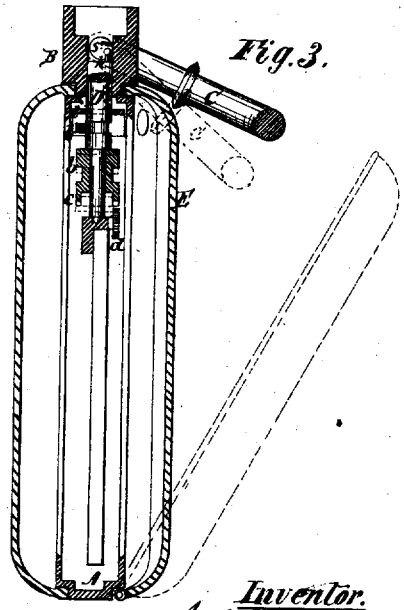
Figure 3 is a similar view, representing in full and dotted lines different positions of certain parts or devices as controlling the setting of the hands by or at the stem.

On one end *s* of the bow C, where it enters the stem, is an eccentric pin or projection, *m*, which is so pitched in relation to a sliding rod or pin, *h*, passing from the stem into the body of the case, that when the bow is extended, as in figs. 1 and 2, it is out of gear or contact with said sliding rod and remains so even when the bow is turned down on the closed cap E or other stop or guard to it; but on opening or removing the guard—say, opening the cap E to see the position of the hands and amount of adjustment necessary to give them—then, on turning the bow C yet further down, as represented in dotted lines in fig. 3, (which the removal of the stop or guard or opening of the cap now admits of,) the eccentric pin *m* is brought to bear and press inward the sliding pin *h*, which touches and compresses a spring, *i*, extending partly around the rim on the inside of the case.

This spring *i* has a tendency to keep pressed outward the sliding pin *h*, which, when forced inward by the action of the eccentric pin *m* connected with the bow C, as described, in compressing said spring causes the latter to bear and drive inward a branch or arm, *j*, of a spring clutch-lever, *k*, said branch or arm working through a suitable guiding cavity or aperture in a fixed bracket or plate, *l*, and the free end of the clutch-lever *k* being forked to fit the clutch *b*.

The lever *k* being forced inward or compressed, it being of a spring or elastic character at its attachment *n* to the case, causes the clutch *b* to slide inward, and with it the contrate wheel *c*, which is accordingly thrown into gear with the pinion *d*, so that by turning the milled cap *a* of the spindle D to the right or to the left the hands of the watch are set forward or backward, as required; but on again throwing back or extending or commencing to lift the bow C, the eccentric pin *m* is released from pressure on the sliding rod *h*, which the spring *i* throws outward, while the spring clutch-lever *k*, in being relieved from the action of the spring *i*, also shoots back and draws with it the clutch which detaches the contrate wheel *c* from gear with the pinion *d*, so that turning the milled cap *a* and spindle D will have no effect upon the setting mechanism of the watch; and the closing of the cap E or putting into action the stop or guard secures or locks the same out of gear, without regard to the position of the bow, which may then be either closed or extended.

As the pendent bow can operate upon the setting mechanism only when the case is open or the stop or guard in action, it will be seen that the parts cannot be accidentally thrown into gear when the case is open.

The winding of the watch at the stem or otherwise may be effected by any suitable means, which it is not necessary here to describe.

What I claim as my invention, and desire to secure by Letters Patent, is—

1. A stem-setting watch, so constructed that the setting mechanism is thrown into gear by turning down the pendent ring or bow when the front cap or case is open, substantially as shown and described.

2. The combination of the cap or guard E with the pendent bow C and hand-setting mechanism, whereby the said cap while closed is made to prevent the bow from throwing the hand-setting mechanism in gear, substantially as shown and described.

JULES JÜRGENSEN.

Witnesses:

E. HUGUENIN,

FRITZ EMILE PERRET.